United States Patent [19]

Brosene, Jr.

[11] 3,827,475
[45] Aug. 6, 1974

[54] LOWER BEAD BREAKER MECHANISM
[75] Inventor: William G. Brosene, Jr., Cincinnati, Ohio
[73] Assignee: Magnum Automotive Equipment, Inc., Cincinnati, Ohio
[22] Filed: Jan. 30, 1973
[21] Appl. No.: 328,011

[52] U.S. Cl. .............................. 157/1.28, 157/1.24
[51] Int. Cl. .......................................... B60c 25/06
[58] Field of Search ......... 157/1.17, 1.2, 1.24, 1.26, 157/1.28

[56] References Cited
UNITED STATES PATENTS
| | | | |
|---|---|---|---|
| 3,032,095 | 5/1962 | Brosene, Jr. et al. | 157/1.28 |
| 3,064,718 | 11/1962 | Brosene, Jr. | 157/1.28 |
| 3,722,570 | 3/1973 | McKenney | 157/1.28 |

Primary Examiner—Othell M. Simpson
Assistant Examiner—Harold P. Smith, Jr.
Attorney, Agent, or Firm—Wood, Herron & Evans

[57] ABSTRACT

A lower bead breaker is mounted for limited vertically upward movement in an arcuate path by virtue of a control arm that is pivotally fixed to the machine's main frame at one end and that is pivotally connected to a fluid motor at the other end, the lower bead breaker's blade being spring loaded against a stop block fixed to the main frame so as to lift the blade off the machine's table and locate same in the home position. The lower bead breaker is selectively adapted to track against a spring loaded, manually positionable travel limiter arm that functions to limit the vertically upward movement of the lower bead breaker's blade in the away or extended position, use of the travel limiter arm depending on the width of the pneumatic tire being processed.

2 Claims, 6 Drawing Figures

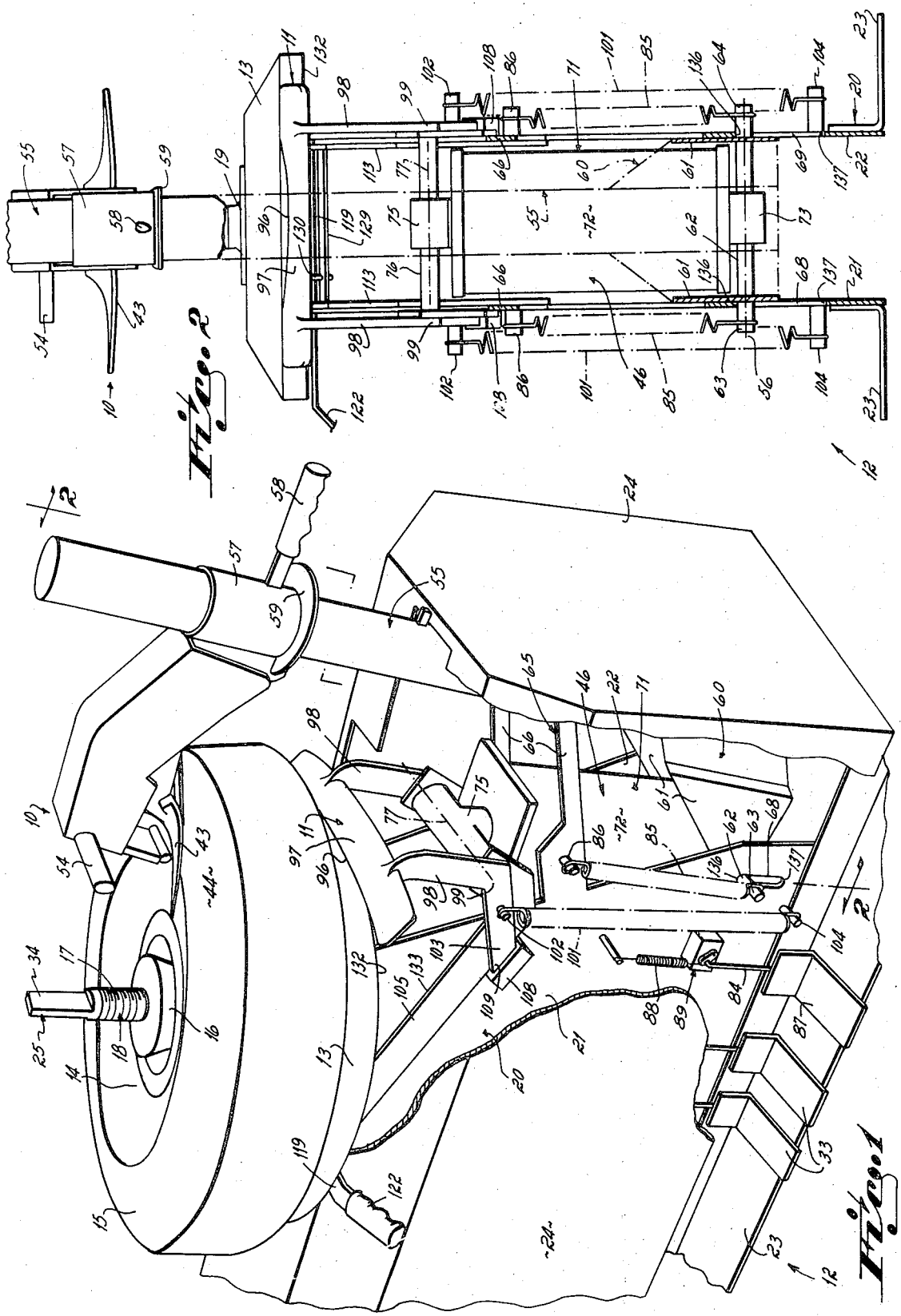

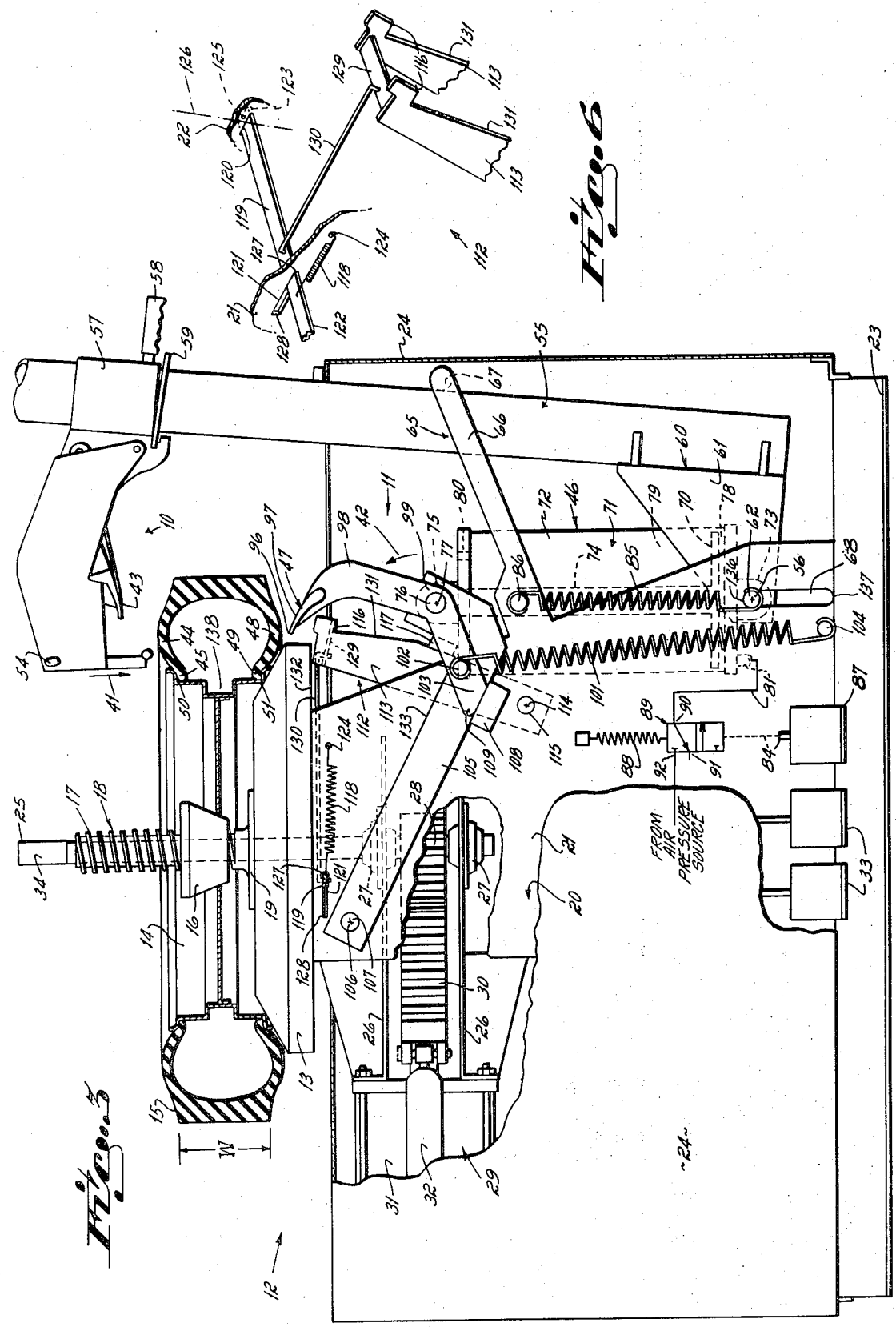

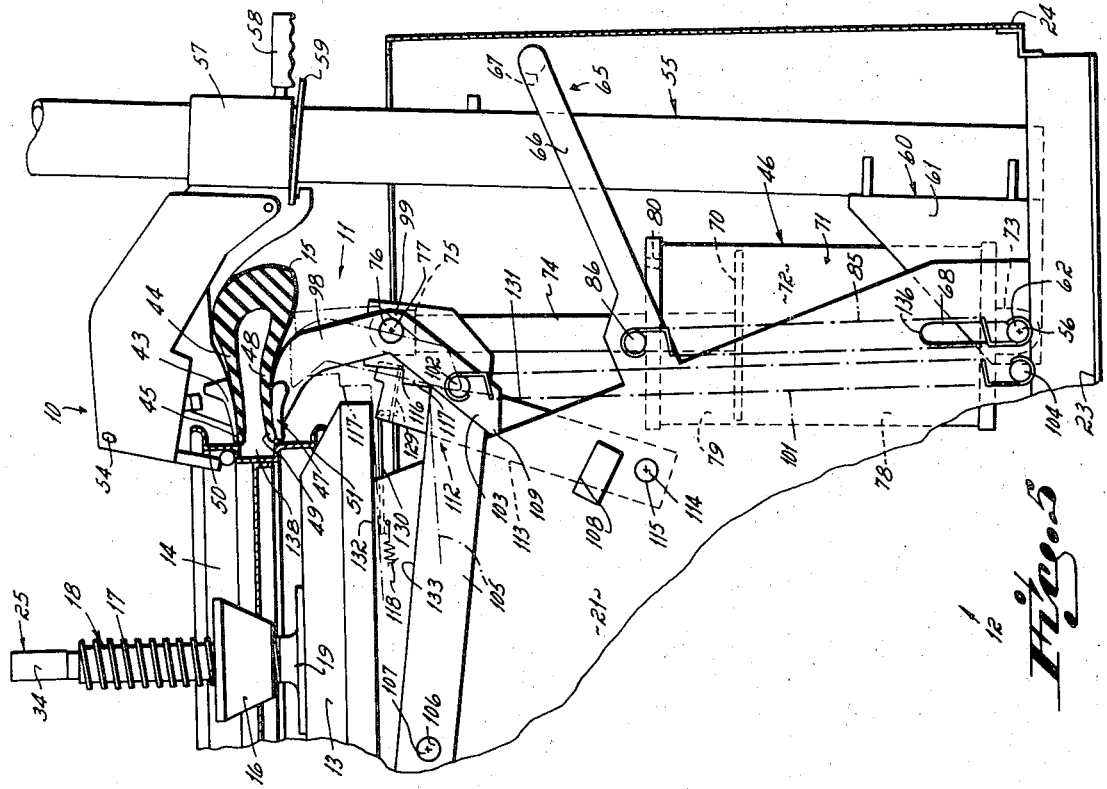
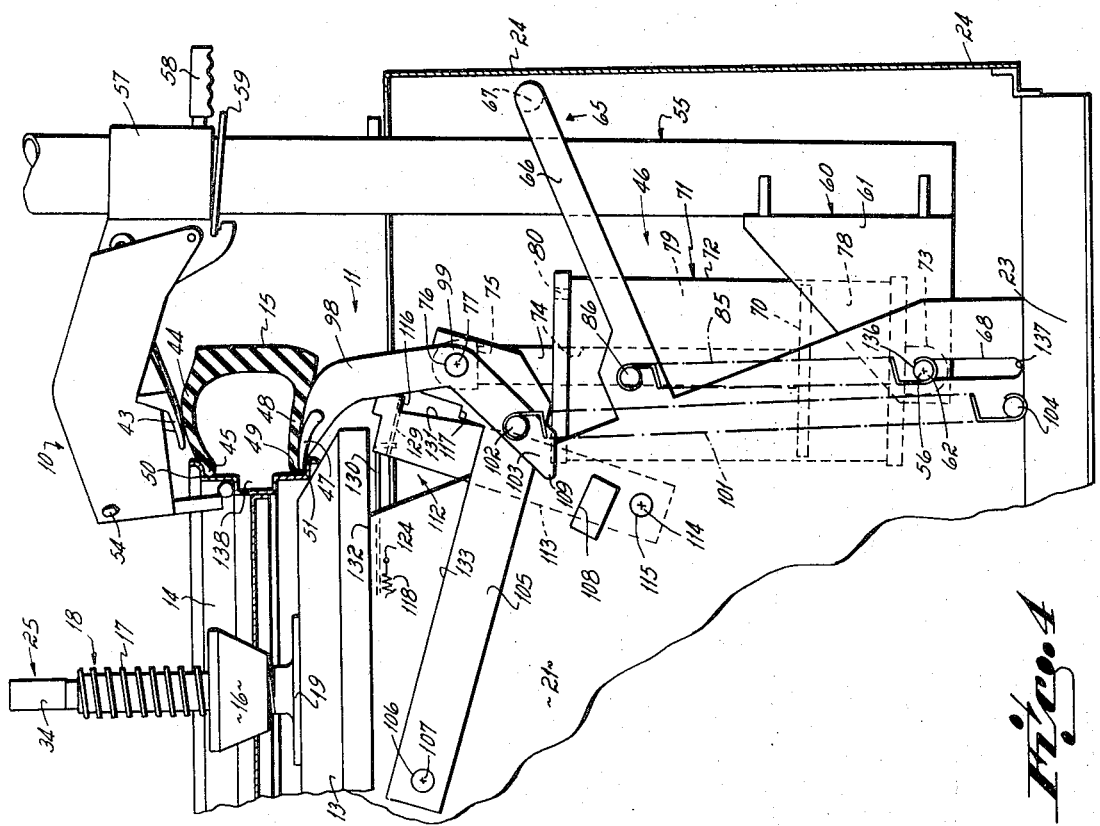

LOWER BEAD BREAKER MECHANISM

This invention relates to automatic tire changer machines. More particularly, this invention relates to an improved bead breaker mechanism for an automatic tire changer machine.

The mounting of a pneumatic tire on a wheel, and the demounting of a pneumatic tire from a wheel, used to be done totally by hand. Such provided major problems for an operator in that a pneumatic tire's beads are relatively inflexible. In mounting a tire on a wheel, the tire's beads must somehow be disposed over one of the wheel's rims into the wheel's well area so as to positively locate the tire on the wheel. In demounting the tire from the wheel, the tire's beads must be somehow removed from the wheel's well area over one of the wheel's rims so that the tire is free of the wheel. Over the years, a number of different types of automatic tire changing machines have been developed which provide means to mechnaically assist an operator in mounting a tire onto, and demounting a tire from, a wheel. Thus, the main objective of an automatic tire changer machine is to aid an operator in demounting a worn or undesirable pneumatic tire from a wheel, and to aid an operator in mounting a new pneumatic tire onto a wheel. Most such tire changing machines include the structural components generally described below.

Generally speaking, the major structural components of an automatic tire changer machine include a horizontally disposed table on which the wheel is initially positioned, an automatically rotatable centerpost that extends up from the table through the center of the wheel, and a mount/demount tool that functions to lift an old tire's beads over the rim off the wheel when the old tire is being demounted, and to seat a new tire's beads over the rim onto the wheel when the new tire is being mounted. The mount/demount tool is interconnected with the centerpost, and is mechanically rotated relative to the wheel through that interconnection, to aid an operator in performing the tire mounting and demounting functions.

In mounting a tire on a wheel, the tire tool (the mounting head of which cooperates with the wheel's rim and the tire's bead to aid in locating the bead within the wheel's well area) is cooperatively engaged with the centerpost. The tire tool extends outward from the centerpost in a radial fashion, the centerpost in effect providing a vertical axis about which the tire tool is rotated for a single revolution, as well as providing the drive means to work the tool's mounting head around the bead to locate the bead over the wheel's rim. Of course, a suitable power unit must be drivingly connected with the centerpost so that same can be mechanically rotated about its vertical axis.

In demounting a tire from a wheel, the tire tool (the demounting head of which cooperates with the tire's beads to aid in lifting the beads over the wheel's rim so as to free the tire from the wheel) is also cooperatively engaged with the centerpost. The tire tool likewise extends outward from the centerpost in a radial fashion, the centerpost again providing the vertical rotational axis for the tire tool as the tool's demounting head is worked around the bead to lift the bead over the wheel's rim and off the wheel. The same power unit is employed to rotate the centerpost whether the tool's mounting head or demounting head is cooperatively engaged with the wheel.

In addition to the structural components previously mentioned, the more advanced automatic tire changer machines also make use of a lower bead breaker and an upper bead breaker. These bead breakers are used only when demounting a tire from a wheel, i.e., are not used when mounting a tire onto a wheel. As is generally known, pneumatic tires are provided with a substantial degree of air pressure inside, and that air pressure must be relieved prior to removing or demounting the tire from the wheel. Further, and particularly in the case of tubeless pneumatic tires, the tire's upper and lower beads (as the tire lies horizontally on the machine's table) are stuck to some extent, i.e., are sealed, against the wheel's upper and lower rims, respectively. Thus, the tire's beads must be broken away from the wheel's rims prior to removing the tire from the wheel during the demounting operation. The tire tool is used to demount the tire from the wheel, as previously explained, subsequent to breaking of the tire's beads from the wheel's rims.

The upper and lower bead breakers are mechanically operated by a power unit to perform the breaking function, i.e., to break the tire's upper and lower beads from the wheel's upper and lower rims. In the more advanced automatic tire changer machines the upper and lower bead breakers are in the nature of jaws which are initially positioned adjacent the tire's upper and lower beads, respectively, and which are then caused to move toward one another relatively simultaneously so as to compress the beads toward one another (i.e., toward the center plane of the wheel and away from the rims of the wheel), thereby breaking the tire's beads away from the wheel's rims and totally depressurizing the tire.

However, there is one major problem in connection with bead breaker mechanisms of the prior art which the lower bead breaker mechanism of this invention overcomes. This problem is occasioned by the necessity to limit the upward travel path distance of the lower bead breaker under certain operating conditions. Pneumatic tires now being marketed by the tire manufacturers come in many different tread widths, the tread width of the narrowest tire differing greatly from the tread width of the widest tire, e.g., a pick-up truck tire vis-a-vis an economy passenger car tire. This wide difference in pneumatic tire widths makes desirable the use of a travel limiter assembly which may be selectively activated to limit the upward travel path of the lower bead breaker during use thereof; typical such prior art assemblies are illustrated in U.S. Pat. Nos. 3,032,095 and 3,064,718. However, such prior art travel limiter assemblies have disadvantages, e.g., safety or operational, which make their use less than satisfactory under certain use conditions.

It has been the main objective of this invention to provide an improved lower bead breaker mechanism which incorporates therewith a novel travel limiter assembly.

In accord with this objective, this invention provides a lower bead breaker mounted for limited vertically upward movement in an arcuate path by virtue of a control arm that is pivotally fixed to the machine's main frame at one end and that is pivotally connected to a fluid motor at the other end, the lower bead breaker's blade being spring loaded against a stop block fixed to the main frame so as to lift the blade off the machine's table and locate same in the home position. The lower bead breaker is selectively adapted to track against a spring loaded, manually pivotable travel limiter arm that functions to limit the vertically upward movement of the lower bead breaker's blade in the away or extended position, use of the travel limiter arm depending on the width of the pneumatic tire being processed.

Other objectives and advantages of this invention will be more apparent from the following detailed description taken in conjunction with the drawings in which:

FIG. 1 is a partially broken away perspective view illustrating an automatic tire changer machine that incorporates the improved bead breaker mechanism structured in accord with the principles of this invention;

FIG. 2 is a cross-sectional end view taken generally along lines 2—2 of FIG. 1 but with the machine's shroud removed;

FIG. 3 is a partially broken away side view illustrating the upper and lower bead breakers in home or fully retracted position;

FIG. 4 is a partial side view similar to FIG. 3, but with a portion of the machine not shown, in which the upper and lower bead breakers are shown in an intermediate operating position;

FIG. 5 is a view similar to FIG. 4 showing the upper and lower bead breakers in away or fully extended position; and FIG. 6 is a perspective view illustrating the major structural elements of the travel limiter assembly.

GENERAL STRUCTURE OF AUTOMATIC TIRE CHANGER MACHINE

The improved bead breaker mechanism 10, 11 of this invention is illustrated in its structural environment in the Figures. As shown in the Figures the improved bead breaker mechanism 10, 11 is structurally integrated with an automatic tire changer machine 12.

The automatic tire changer machine 12 includes a horizontally disposed table 13 adapted to receive a wheel 14 having a fully inflated pneumatic tire 15 mounted thereon, see FIGS. 1 and 3. The wheel 14 is held in fixed position on the table by a hold-down cone 16, the hold-down cone being threadedly engaged with exteriorly threaded (as at 17) cylinder 18. The cylinder 18 is immobily mounted to the table 13 by collar 19.

The table 13 itself is supported on and fixed to the machine's main frame 20, see FIG. 2. The main frame 20 includes parallel and spaced apart side walls 21, 22 that are stationary and that terminate in and are fixed to flanged feet 23. The feet 23 extend the length of the machine 12 and are adapted to be bolted to a concrete floor in, e.g., a gasoline station, to provide stability for the machine during its operational cycle. A shroud 24 is fixed to the main frame 20 for enclosing the operational structure, e.g., power units, of the machine 12.

A centerpost 25 extends vertically upward from beneath the table 13 to a terminal point above the wheel 14. The rotatable centerpost 25 is coaxially and interiorly located relative to the fixed threaded cylinder 18. The outside diameter of the centerpost 25 is sized relative to the inside diameter of the threaded cylinder 18 so that the centerpost can easily rotate relative thereto in either the clockwise or counter-clockwise direction. The centerpost 25 is mounted to the machine's main frame 20 at its lower end portion between opposed plates 26 that are welded between side walls 21, 22 of the frame, each of the plates mounting a bearing block 27 which receives the centerpost. Thus, the centerpost 25 is supported for rotation at spaced locations adjacent its lower end portion by means of the two bearing blocks 27, and is supported for rotation adjacent its upper end portion by virtue of passing through threaded cylinder 18. The centerpost 25 carries a pinion gear 28, the gear being located on the centerpost between the bearing blocks 27 and being drivingly connected with a first or centerpost power unit 29.

The first modular power unit 29 is fixed to the machine's main frame plates 26 in driving relation with the centerpost's pinion gear 28. The first or centerpost power unit 29 includes a straight rack 30, fluid motor 31, and a pair of shock absorbers 32, see FIG. 3. Note that the linear rack 30 is oriented transverse to the centerpost 25, i.e., the linear rack is adapted to reciprocate in a horizontal path and the centerpost is adapted to rotate about a vertical axis. The linear rack 30 is directly fixed to the fluid motor's piston (not shown), the fluid motor being a pneumatic motor (although it may be a hydraulic motor, if desired) capable of being operated by high pressure air such as is commonly found in gasoline stations and the like. Rotation of the centerpost 25 is operator controlled through foot pedals 33. The power unit 29 for rotating the centerpost 25 is particularly disclosed in U.S. Pat. Application Ser. No. 328,016, entitled CENTERPOST DRIVE MECHANISM, invented by William G. Brosene, Jr. filed simultaneously herewith.

The automatic tire changer machine 12 also includes upper 10 and lower 11 bead breakers, as mentioned. The upper 10 and lower 11 bead breakers are adapted to move toward one another in general travel paths 41, 42, respectively, that are substantially vertical relative to the horizontal plane of the wheel 14 as the wheel rests on the machine's table 13; note, however, that the upper bead breaker's general travel path 41 is straight whereas the lower bead breaker's general travel path 42 is arcuate. Operation of the upper bead breaker 10 is accomplished by moving upper blade 43 downwardly against the tire's upper side wall 44 adajcent the tire's upper bead 45 by a second or bead breaker power unit 46. Operation of the lower bead breaker 11 is accomplished by moving lower blade 47 upwardly against the tire's lower side wall 48 adjacent the tire's lower bead 49 by the power unit 46. The second power unit 46, in effect, both interconnects and powers the two bead breakers 10, 11. This downward motion of the upper bead breaker 10 and upward motion of the lower bead breaker 11 may occur substantially simultaneously and, in essence, serves to break or separate the tire's upper 45 and lower 49 beads away from the upper 50 and lower 51 rims of the wheel 14 on which the tire 15 is mounted, compare FIGS. 3 and 5. This prepares the tire for subsequent demounting from the wheel by use of the tire tool (not shown).

As noted, when an operator desires to demount a tire from a wheel, the operator must make use of the bead breaker mechanism 10, 11 of this invention prior to removing the tire from the wheel. That is, the tire's beads must be broken away from the wheel's rims prior to completely removing or demounting the tire from the wheel. After the beads have been broken, the slotted body section of a tire tool (not shown) is engaged with the centerpost's flatted portion 34 so that rotation of the centerpost 25 is translated into rotation of the tire tool. After the tire tool (not shown) has been engaged with the centerpost 25, and after the tire tool's demount head (not shown) has been operatively positioned between the tire's bead and the wheel's upper rim, rotation of the centerpost 25, i.e., rotation of the tire tool's demount head (not shown), causes the tire's bead to be lifted over the wheel's upper rim so that the tire 15 is totally removed from the wheel 14. A mount-/demount tire tool particularly adapted for use with the automatic tire changer 12 is illustrated in U.S. Patent Application Ser. No. 328,010, entitled MOUNTING HEAD FOR A TIRE TOOL, invented by Donald D. Rainey, filed simultaneously herewith.

DETAILED STRUCTURE OF BEAD BREAKER MECHANISM

Upper Bead Breaker

The upper bead breaker 10 is interconnected with power column 55 through collar 57, the power column being directly and pivotally connected, as at 56, with the bead breaker's power unit 46, see FIGS. 3–5. The power column 55 functions to draw the upper bead breaker 10 downwardly against the upper side wall 44 of the tire 15 during breaking of the tire's upper bead 45 from the wheel's upper rim 50 because it is directly connected to the power unit 46 as will be explained in detail below.

The cylindrical collar 57 that interconnects the upper bead breaker 10 and the cylindrical power column 55 at the top of the power column is part of the upper bead breaker, the collar having an inside diameter relative to the power column's outside diameter that allows it to be telescoped over and axially slidable relative to the power column. The slidability of the collar 57 (and, hence, the upper bead breaker 10) relative to the power column 55 provides structure that allows the machine's operator to positon the upper bead breaker's blade 43 on the top side wall 44 of the tire 15 being demounted regardless of the tread width W of the tire on the machine's table 13. Further, the slidability of the collar 57 relative to the power column 55, in combination with the concentricity of the collar/power column structure, allows the upper bead breaker 10 to be swung outwardly out of the way when the tire/wheel is being lifted on or off the table 13, i.e., allows the upper bead breaker 10 to be swung into a plane transverse to the plane in which it is shown in all the Figures, so that it is off to the side of the table 13 where it does not impede locating the tire/wheel on, or removing the tire/-wheel from, the table. Handles 54, 58 are permanently fixed to the upper bead breaker 10 to aid the operator in lifting or moving the upper bead breaker upwardly along the power column 55 as desired by the operator. The upper bead breaker mechanism 10, its structural elements and its function, is more particularly illustrated in U.S. Pat. Application Ser. No. 328,008, entitled UPPER BEAD BREAKER MECHANISM, invented by David W. Besuden and William G. Brosene, Jr., filed simultaneously herewith.

A latch 59 is adapted to cooperate with the upper bead breaker 10 and the power column 55. The latch 59 serves to maintain the upper bead breaker 10 in its present location on the power column when the upper bead breaker mechanism is in use, i.e., when the tire's upper bead 45 is being broken from the wheel's upper rim 50. The latch 59, and its structural elements and its function, is more particularly illustrated in U.S. Patent Application Ser. No. 328,015, entitled POWER COLUMN LATCH, invented by David W. Besuden, filed simultaneously herewith.

The power unit 46 and power column 55 are located between the side walls' planes, see FIG. 2. The power column 55 is permanently fixed to a U-shaped bracket 60 at its bottom end, see FIGS. 2 and 3. The U-shaped bracket's arms 61 are pivotally connected to a crossbar 62 fixed immobily to power unit 46, thereby pivotally connecting (on axis 56) the upper bead breaker 10 and power column 55 to the power unit 46. The power unit's crossbar 62 extends between and beyond the main frame's stationary side walls 21, 22, and each end 63, 64 of the crossbar is captured in a vertical slot 68, 69, respectively, defined in each of the main frame's side walls. This element combination provides substantial stability and structural rigidity to the bead breaker mechanism 10, 11. Thus, the upper bead breaker 10 is adapted for vertical movement in a straight line path as will be explained in detail below, and is provided with a substantially in-line power thrust or transfer from the power unit 46.

A U-shaped holder or cradle 65 is mounted to the main frame 20, the arms 66 of the cradle being fixed to side walls 21, 22 of the main frame, see FIG. 3. The cradle 65 functions as a support for the power column 55 when same is in the home or nonoperative attitude illustrated in FIG. 3, the power column falling clockwise about the pivot axis 56 into home or supporting contact with the cradle's base 67 when not in operational relation with the tire 15 as shown in FIGS. 4 and 5. Thus, and by virtue of the pivotal connection 56 between the power column 55 and the power unit 46, the upper bead breaker 10 can be manually moved between a home or rest position where it is supported by cradle 65 as shown in FIG. 3, and an operating position where it is operatively engaged with the tire 15 and wheel 14 as shown in FIGS. 4 and 5.

Power Unit

The second or bead breaker power unit 46 is in the form of a fluid motor that may be either pneumatically or hydraulically driven, although a pneumatic motor 71 is illustrated. The pneumatic motor 71 includes housing 72 (on which ear 73 is fixed at the bottom end) and an extensible piston rod 74 (on which ear 75 is fixed at its top or exposed end), see FIG. 3. The bottom ear 73 carries crossbar 62, thereby pivotally interconnecting the motor's housing 72 with the power column 55 (and, hence, with the upper bead breaker 10) at the column's bottom end on axis 56. The top ear 75 carries crossbar 76 to which the lower bead breaker 11 is pivotally connected, as at axis 77, thereby pivotally interconnecting the motor's piston rod 74 with the lower bead breaker. The piston rod 74 is interconnected with a piston head 70 interiorly of the housing 72, thereby dividing the housing into chambers 78, 79. Chamber 78 is connected to a high pressure air source (such as is found in gasoline stations and the like) through source line 81 as is described below. A check valve 80 to atmosphere is provided for chamber 79, the check valve allowing outside air to be drawn into the chamber 79 but preventing air within chamber 79 from being exhausted to atmosphere.

Motor springs 85 are located on the outside of the main frame's side walls 21, 22, and are provided to continually bias or load the fluid motor's housing 72 into the home position as illustrated in FIG. 3. Thus, motor springs 85 also continuously bias the upper bead breaker 10 towards the home or rest position since same is connected (as at 56) to the motor's housing 72. Each of the springs 85 is attached at one end to a pin 86 mounted on a side wall 21, 22 of the main frame 20, and attached at the other end to that motor crossbar 62 which is pivotally connected with the power column 55, see FIG. 2. Note that the springs 85 are located exteriorly of the main frame's side walls 21, 22, and that the power column's bracket arms 61 are located interiorly of the main frame's side walls, thereby trapping each side wall between a spring and a frame arm so as to positively maintain the crossbar within the vertical slots 68, 69 defined in the frame's side walls during operation of the machine 12.

The pneumatic circuit for control of the fluid motor 71 is controlled by means of a foot pedal 87 adajcent the base 23 of the machine, see FIGS. 1 and 3. The foot pedal is interconnected by rod 84 with a spring 88 loaded three-way valve 89. The valve 89 is interconnected with power chamber 78 of the pneumatic motor 71 at motor port 90 and through line 81. The three-way valve 89 is continually biased toward vent port 91 by tension spring 88, thereby continuously opening power chamber 78 of the fluid motor 71 to atmosphere through line 81 unless the foot pedal 87 is actuated by the machine's operator. The three-way valve 89 is also connected with a high pressure air source (through source port 92) such as commonly is found in gasoline stations and the like. Thus, when power chamber 78 is supplied with high pressure air through three-way valve 89 upon actuation of the foot pedal 87, the piston head 70 moves upwardly in the housing 72 (air in static chamber 79 being exhausted to atmosphere through leakage around piston rod 74 since check valve 80 is pressure biased closed). By exhausting static chamber 79 air to atmosphere through the port in motor housing 72 through which the piston rod 74 extends, a dashpot type effect is obtained because the air is forced out a restricted orifice. This dashpot effect prevents sudden movement to the upper 10 and/or lower 11 bead breaker, with the accompanying shock to the equipment, if either of the tire's beads should suddenly break away from the wheel's rims. Upon release of the foot pedal 87 by the operator, the spring 88 loaded valve returns to vent port 91 so that power chamber 78 of the fluid motor 71 is vented to atmosphere. When the motor's power chamber 78 is vented to atmosphere, springs 85 function to retract the motor's housing 72 upwardly relative to the slots 68, 69 as atmospheric air is introduced into chamber 79 through check valve 80, thereby returning the motor housing 72 (and the upper bead breaker 10) to the home position.

The upwardly moving piston head 70 forces the top crossbar 76 upwardly (to which the lower bead breaker 11 is interconnected, as will be explained in detail below), thereby breaking the tire's lower bead 49 from the wheel's lower rim 51. When the piston reaches its upper travel limit (due to structure associated with the lower bead breaker 10 as will be explained in further detail below), the fluid motor's housing 72 moves downwardly against the spring 85 forces. This forces the bottom crossbar 62 downwardly along a restricted linear path defined by the vertical slots 68, 69 in the main frame's side walls 21, 22, thereby drawing the power column 55 (and, hence, the upper bead breaker 10) downwardly so as to break the tire's upper bead 45 from the wheel's upper rim 50.

Lower Bead Breaker

The lower bead breaker 11 includes the slightly curved blade 47 that defines a leading edge 96, and that is oriented to contact the bead 49 area of a tire's lower side wall 48 with its top face 97. The blade 47 is integral with an arm 98 at each end thereof, the arms 98 (and, therefore, the blade 47) being pivotally connected to the power unit's top crossbar 76 at elbows 99, i.e., on pivot axis 77.

The lower bead breaker's blade 47 is spring 101 loaded. This spring loading continually biases blade 47 to move about axis 77 toward the table 13, i.e., in a counterclockwise direction as illustrated in the Figures and continually biases blade 47 toward the rest or home position where piston rod 74 is fully retracted into motor housing 72, see FIGS. 2 and 3. The detailed effect of the springs 101 is described in detail below. Each spring 101 is connected at one end to a pin 102 fixed on the lower bead breaker's arm 98 adjacent the arm's foot 103, and is connected at the other end to pin 104 fixed on the main frame's side wall 21, 22 adjacent the base 23 of the main frame. A stop 108 is fixed to the outside of each of the main frame's side walls 21, 22, the steps being positioned to cooperate with the cam toes 109 of the lower bead breaker's arms 98 as will be described in detail below. The lower bead breaker's arms 98 are positioned exteriorly of the frame's side walls 21, 22, and the springs 101 are located on the outside of the frame's side walls, thereby capturing the side walls of the main frame between the lower bead breaker's arms so as to prevent peripheral movement of the lower bead breaker mechanism 11 relative to the table 13.

Control arms 105 are connected with the lower bead breaker's blade 47 and pneumatic motor 71 to guide or control the upward arcuate general path 42 of the blade when the motor is energized. A control arm 105 is mounted on each side of the machine's main frame 20 exteriorly of the frame's side walls 21, 22, see FIGS. 2 and 3. Each control arm 105 is pivotally mounted to a side wall 21 or 22 at one end by pin 106 to provide pivot axis 107, and is also pivotally connected to the motor's upper crossbar 76 at the other end on pivot axis 77. These control arms 105 (both of which have a common pivot axis 107 where they are connected to the main frame's side walls 21, 22) function to allow the pivotal interconnection of the lower bead breaker's blade 47 with the fluid motor's crossbar 76 to track in an upward arcuate path 42, thereby providing a simple means during use to stabilize the pivot axis 77 of the lower bead breaker's blade as the blade is being moved upwardly by the motor 71 and as the blade is pivoting on the upper crossbar 76.

The lower bead breaker 11 also includes a travel limiter assembly 112 that functions to limit the upward travel of the lower bead breaker's blade 47, see FIGS. 3 and 6. Such limitation on the upward movement of the lower bead breaker's blade 47 is desirable if a narrow tread width W tire is being processed on the machine. The travel limiter assembly 112 includes a pair of travel limiter arms 113, each being pivotally mounted to the inside of the main frame's side walls 21, 22, respectively, on pivot axis 114 by pin 115. Each travel limiter arm 113 is notched at the upper end to define a seat 116, this seat being adapted to function as an abutment for bar 117 fixed to and extending between the control arms 105.

The travel limiter arms 113 are spring 118 loaded continuously to that attitude illustrated in FIG. 3, and are connected with that spring 118 by means of a positioner arm 119 which extends from beneath the table 13 beyond the machine's shroud 24. The positioner arm 119 is carried by the main frame's side walls 21, 22, pivot end 123 of the arm 119 protruding only slightly through hole 120 in side wall 22 and extending a substantial distance beyond side wall 21 after passing through elongated slot 121 so that handle end 122 protrudes outward from beneath the table 13 where it is readily accessible to the operator. The spring 118 is located exteriorly of the side wall 21, and is fixed at one to the positioner arm 119 and at the other end to a hole 124 in the frame's side wall 21. Cotter pin 125 is passed through the arm's pivot end 123 exteriorly of the side wall 22. Thus, the control arm 119 is adapted to pivot about general pivot axis 126 in a horizontal plane, the limits of that pivotal movement being defined by the ends 127, 128 of the elongated slot 121. The positioner arm 119 is connected to frame member 129 (and, hence, to the travel limiter arms 113 since those arms 113 are connected by the frame member 129) by link 130, see FIG. 6.

Normally the positioner arm 119 is located at end 127 of the elongated slot 121 since it is continuously spring 118 loaded toward that slot end 127. This automatically positions the travel limiter arms 116 in location for use with a narrow tread width W tire, i.e., in location as shown in FIG. 3. When the travel limiter arm is in this operational attitude, and as the lower bead breaker's blade 47 is moved upwardly by the fluid motor 71, bar 117 (which connects the lower bead breaker's arms 98) tracks or rides on edges 131 of the travel limiter arms 113. Thus, the interengagement of the lower bead breaker's bar 117 with the travel limiter arms' seats 116 is assured so as to limit the upward travel movement of the lower bead breaker's blade 47.

When the positioner arm 119 is drawn to the left (as viewed in FIGS. 3 and 6) by manually grasping the arm's handle end 122, the link 130 pivots the travel limiter arms 123 counterclockwise (as viewed in the figures) about pivot axis 114 so as to remove seats 116 from the travel path of the bar 117 that joins the lower bead breaker's arms 98, thereby allowing the lower bead breaker's blade 47 to continue in its upward travel until edges 133 of the lower bead breaker's control arms 105 engage the underside or base rim 132 of the table 13. The handle end 122 of the positioner arm 119 must be manually held against slot end 128 when the extra upward travel of the lower bead breaker's blade 47 is desired; once the handle end is released the positioner arm returns to the FIG. 3 attitude because of its spring 118 loading.

Detailed Operation of Bead Breaker Mechanism

In use, the home or fully retracted position of the upper 10 and lower 11 bead breakers, and of the fluid motor 71, are illustrated in FIG. 3. As shown in that Figure, the upper bead breaker 10 is spaced from the tire's upper side wall 44, and the power column 55 is pivoted about axis 56 to its rest position against the base 67 of cradle 65. Further, the lower bead breaker 11 is retracted away from the table 13 and out of contact with the tire's lower side wall 48. The power chamber 78 of the fluid motor 71 is vented to atmosphere through vent port 91 in the three-way valve 89, and static chamber 79 is vented to atmosphere through the port where piston rod 74 protrudes from motor housing 72. Thus, pressure in both chambers 78, 79 of the pneumatic motor 71 is atmospheric. This motor 71 condition allows springs 85 to fully retract the motor's housing 72 and crossbar 62 up to the top end 136 of the vertical slots 68 in the main frame's side walls 21, 22, thereby pushing the power column 55 (and, hence, the upper bead breaker 10) up into the home position shown in FIG. 3. This motor 71 condition also allows springs 101 to fully retract the piston rod 74 into the motor housing 72, thereby retracting the lower bead breaker's blade 47 along arcuate path 42 into the home position. The lower bead breaker's blade 47 is fully retracted out of contact with the table 13, as the piston rod 74 is drawn into the housing 72 by the springs 101, by virtue of cam toes 109 on the blade'arms 98 which ride up on stop blocks 108 fixed to the machine's side walls 21, 22 as the piston rod 74 bottoms out into the motor's housing 72. This causes the lower bead breaker's blade 47 to pivot away from the centerpost 25 (clockwise as shown in the Figures) against the bias of springs 101. The travel limiter assembly 112, unless manually withdrawn from position with the lower bead breaker's bar 117, is spring 118 loaded into that position so that edges 131 of the travel limiter arms 113 are urged against the lower bead breaker's bar 117.

Prior to commencing operation of the bead breaker mechanism 10, 11, the upper bead breaker's blade 43 is positioned in relation to the tire's top side wall 44 and the wheel's top rim 50 as illustrated in FIG. 4 by manually pivoting power column 55 about axis 56, thereby pivoting same toward the centerpost 25 and off the base 67 of cradle 65. A more particular description of the upper bead breaker 10, and its operation, as mentioned prior hereto will be found in U.S. Pat. Application Ser. No. 328,008, entitled UPPER BEAD BREAKER MECHANISM, invented by William G. Brosene, Jr. and David W. Besuden, filed simultaneously herewith. Power column latch 59 associated with the upper bead breaker 10 maintains the upper bead breaker in fixed position on the power column 55 during operation of the bead breaker mechanisms 10, 11, the structure and operation of that latch being more particularly set out in U.S. Pat. Application Ser. No. 328,015, entitled POWER COLUMN LATCH, invented by David W. Besuden, filed simultaneously herewith.

After the upper bead breaker 10 has been operationally located as illustrated in FIG. 4, the operator depresses foot pedal 87, thereby causing the bead 45, 59 breaking operational sequence to be carried out automatically until both beads are broken away from the wheel's rims 50, 51 as illustrated in FIG. 5. When the foot control pedal 87 of the pneumatic circuit is depressed, three-way valve 89 is biased to the high pressure air port 92. This introduces high pressure air into the fluid motor's power chamber 78 through line 31, thereby forcing the piston 70 toward the top of the motor housing 72 from the bottom of that housing. As the piston 70 is forced toward the top of the motor's housing 72, the lower bead breaker's blade 47 is moved upwardly along arcuate path 42 (since it is connected to piston rod 74 through crossbar 76), see FIG. 4. As the lower bead breaker's blade 47 is moved upwardly, the lower bead breaker's feet 103 are lifted of the stationary stop blocks 108, thereby allowing the lower bead breaker's blade to pivot about axis 77 toward the centerpost 25, i.e., in a counterclockwise direction as illustrated in the Figures. It is important to note, that once the lower bead breaker's feet 103 are removed from interengagement with the stop blocks 108, the leading edge 9 of the lower bead breaker's blade contacts the table 13 and rides up on the table's surface until it hits the wheel's lower rim 51. As the pneumatic motor 71 continues to move the lower bead breaker's blade upwardly, the blade rides up on the wheel's rim 51 and tracks or follows the rim's contour until the tire's lower bead 49 is displaced into the wheel's well 138, see FIG. 5. This tracking function of the lower bead breaker's blade 47 is a result of the spring 101 loading provided, that spring loading tending to rotate the lower bead breaker's blade in the counterclockwise direction as illustrated in the Figures.

As the lower bead breaker's blade 47 moves upward in response to the fluid motor 71, bar 117 fixed between the lower bead breaker's arms 98 tracks along edge 131 of the travel limiter arms 113 when the travel limiter assembly 112 is in the attitude illustrated in FIGS. 3–5. The lower bead breaker's bar 117 ultimately abuts against or is caught by seats 116 defined in the travel limiter arms 113 at the top thereof. Thus, the upward travel of the lower bead breaker's blade 47 is limited by this interengagement of the lower bead breaker's bar 117 with the seats 116 defined by the travel limiter assembly's arms 113.

The travel limiter assembly 112 is functionally interposed to cooperate with the lower bead breaker's bar 117 only when a relatively narrow tread width W tire 15 is in place on the machine's table 13. A relatively wide tread width tire requires additional upward travel of the lower bead breaker's blade 47 so as to adequately break the tire's lower bead away from the wheel's lower rim. When such is desired, the handle end 122 of positioner arm 119 is grasped by the operator and the positioner arm pivoted about axis 126 against the bias of spring 118, thereby removing the travel limiter arms 113 from the travel path of the lower bead breaker's bar 117. The positioner arm 119 is then manually held against slot end 128 against the spring 118 bias while the lower bead breaker is operated; this out-of-the-way or nonfunctional attitude of the travel limiter assembly is illustrated in phantom lines in FIG. 5. When the travel limiter assembly 112 is out of operational position as shown in FIG. 5's phantom lines, the upward movement of the lower bead breaker's blade 47 is limited by contact of the control arms 105 with the underside of the machine's table 13, i.e., with the table's base rim 132.

Once the lower bead breaker 11 has 'topped out', i.e., once the lower bead breaker has either abutted against the seats 116 defined by the travel limiter arms 113 (if those arms are in operational position) or once the control arms 105 have abutted the table's base rim 132 (if the travel limiter assembly 112 has been retracted by use of the positioner arm 119), the pneumatic motor's housing 72 begins to move downwardly in response to the continued pneumatic pressure in power chamber 78. This downward motion of the motor's housing 72 is occasioned because of the fact that the motor's piston head 70 is now in a fixed location and unable to move upward any further (either because lower bead breaker's bar 117 is interengaged with the travel limiter arms seats 116 or because the control arms 105 are abutted against the bottom edge 132 of the machine's table 13). This for the reason that the high pressure air in the fluid motor's power chamber 78 provides downward force on the bottom of the motor's housing 72 sufficient to overcome the spring 85 loading in the upward direction. The downward motion of the fluid motor's housing 72 is, of course, translated into downward motion for the power column 55 and upper bead breaker mechanism 10 because the power column is directly connected with the housing by crossbar 62 at pivot axis 56. The downward motion of the fluid motor's housing 72 is vertical in nature because of the vertical slots 68, 69 in the main frame's side walls 21, 22, thereby guiding the upper bead breaker 10 downward in a vertical, straight line path. The downward movement of the fluid motor's housing 72 is terminated when crossbar 62 bottoms out against the bottom end 137 of the vertical slots 68, 69. At this location the motor's piston rod 74 and housing 72 are fully extended relative one to the other, and the tire's upper bead 45 has been broken away from the wheel's top rim 50 as well as the tire's lower bead 49 has been broken away from the wheel's bottom rim 51, see FIG. 5.

After the tire's beads 45, 49 have been broken away from the wheel's rims 50, 51, the operator releases foot pedal 87. The spring 88 loading on the three-way valve 89 returns the valve to the vent port 91 attitude, thereby releasing the high pressure air from the power chamber 78 in the fluid motor 71. Once the motor's high pressure chamber 78 is exhausted to atmosphere, springs 85 cause the housing to move upwardly until crossbar 62 abuts top slot ends 136 of the main frame's vertical slots 68, 69, i.e., springs 85 cause the motor's housing 72 to return to the home position illustrated in FIG. 3. This return of the fluid motor's housing to the attitude illustrated in FIG. 3 causes the power column 55 to move upwardly and, thereby, causes the upper bead breaker 10 to be returned to the initial or starting position illustrated in FIG. 3 from whence it can be moved out of operational contact with the tire 15. Further, the piston rod 74 is fully retracted into the fluid motor's housing 72 and the lower bead breaker 11 drawn downwardly because of springs 101 fixed at one end to the machine's main frame 20 and at the other end to the lower bead breaker arms 98. As the lower bead breaker's blade 47 is drawn downwardly by springs 101, same follows the contour of the wheel's outer surface and of the table in a reverse direction until feet 103 of the lower bead breaker's arms approach the stop blocks 108. As cam toes 109 engage the stop blocks 108, the lower bead breaker's blade 47 is pivoted clockwise as illustrated in the figures so as to remove same from contact with the machine's table 13 back into the home or fully retracted attitude illustrated in FIG. 3.

The operation of the bead breaker mechanism 10, 11 of this invention has been described by indicating that the lower bead breaker 11 is first pushed upwardly, and the upper bead breaker 10 is subsequently pulled downwardly, by the fluid motor 71. Actual operation of the bead breaker mechanism 10, 11 may or may not follow this exact sequence. In actual operation it may be the upper bead breaker 10 that will move downwardly prior to the lower bead breaker 11 moving upwardly. However, and as is most often the case, actual operation of the machine will result in both upper 10 and lower 11 bead breakers moving toward one another in a substantially simultaneous manner. The exact sequence of bead breaker mechanism 10, 11 operation is mainly dependent on the degree to which each of the tire's beads 45, 49 are stuck or adhered to the wheel's rims 50, 51. For example, if the tire's upper bead 45 is more tightly stuck or adhered to the wheel's upper rim 50 than is the tire's lower bead 49 stuck or adhered to the wheel's lower rim 51, then the lower bead breaker 11 will move upwardly before the upper bead breaker 10 moves downwardly because there will be less initial resistance for the lower bead breaker to overcome than there is resistance for the upper bead breaker mechanism to overcome. However, in actual operation it will more likely be the case that the upper 10 and lower 11 bead breakers will operate substantially simultaneously upon introduction of high pressure air to the power chamber 78 of the pneumatic motor 71 once the pedal 87 has been depressed by the operator because it is most often the case that both of the tire's beads 45, 49 are roughly stuck to the same degree to the wheel's rims 50, 51.

Having described in detail the preferred embodiment of my invention, what I desire to claim and protect by Letters Patent is:

1. In a lower bead breaker mechanism of the type that includes a lower bead breaker having a blade adapted to move in response to a power unit for breaking a lower bead away from a wheel's lower rim, an abutment connected to said lower bead breaker's blade, and a travel limiter assembly adapted to move selectively into and out of the path of said abutment prior to moving of said blade upwardly for limiting the upward movement of said blade when desired, the improvement in said travel limiter assembly comprising a travel limiter arm that defines a seat and a track, said travel limiter arm being interconnected with said lower bead breaker mechanism a control handle connected with said arm, said control handle being readily accessible to the machine's operator for moving said travel limiter arm seat into and out of the travel path of said lower bead breaker's abutment, and spring means continuously biasing the travel limiter arm's seat into the path of said lower bead breaker's abutment, said spring means causing said lower bead breaker's abutment to follow said track on said travel limiter arm so as to insure interengagement thereof with said seat when the upper limit of the lower bead breaker's upward path has been reached unless said travel limiter arm seat has been withdrawn out of the abutment's travel path by said control handle.

2. An improved bead breaker mechanism as set forth in claim 1 wherein said travel limiter arm is adapted to pivot in a substantial vertical plane, and said control handle is adapted to pivot in a substantial horizontal plane beneath the machine's table.

* * * * *